United States Patent
Elgimiabi

(10) Patent No.: US 10,233,280 B2
(45) Date of Patent: Mar. 19, 2019

(54) TWO-PART LIQUID SHIM COMPOSITIONS

(71) Applicant: 3M INNOVATIVE PROPERTIES COMPANY, St. Paul, MN (US)

(72) Inventor: Sohaib Elgimiabi, Dusseldorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/335,876

(22) Filed: Oct. 27, 2016

(65) Prior Publication Data

US 2017/0044306 A1    Feb. 16, 2017

Related U.S. Application Data

(63) Continuation of application No. 12/702,446, filed on Feb. 10, 2010.

(60) Provisional application No. 61/151,076, filed on Feb. 9, 2009.

(51) Int. Cl.
| | |
|---|---|
| *C08G 59/00* | (2006.01) |
| *B29C 70/00* | (2006.01) |
| *C08G 59/56* | (2006.01) |
| *C08G 59/18* | (2006.01) |
| *C08G 59/50* | (2006.01) |
| *C08G 59/54* | (2006.01) |
| *C08G 59/60* | (2006.01) |
| *B29C 70/84* | (2006.01) |
| *C09D 163/00* | (2006.01) |
| *B29K 63/00* | (2006.01) |
| *B29K 105/20* | (2006.01) |

(52) U.S. Cl.
CPC ............ *C08G 59/56* (2013.01); *B29C 70/845* (2013.01); *C08G 59/184* (2013.01); *C08G 59/504* (2013.01); *C08G 59/54* (2013.01); *C08G 59/60* (2013.01); *C09D 163/00* (2013.01); *B29K 2063/00* (2013.01); *B29K 2105/20* (2013.01); *C08G 2650/50* (2013.01)

(58) Field of Classification Search
None
See application file for complete search history.

(56) References Cited

U.S. PATENT DOCUMENTS

| | | | |
|---|---|---|---|
| 4,814,415 A | 3/1989 | Sellstrom | |
| 4,853,456 A | 8/1989 | Sellstrom | |
| 4,886,867 A | 12/1989 | Lin | |
| 4,940,770 A | 7/1990 | Speranza | |
| 4,945,925 A | 8/1990 | Strohmayer | |
| 5,032,629 A | 7/1991 | Hansen | |
| 5,565,505 A | 10/1996 | Papalos | |
| 5,567,748 A | 10/1996 | Klein | |
| 5,769,506 A | 6/1998 | Papalos | |
| 6,224,710 B1 | 5/2001 | Rinde | |
| 6,294,597 B1 | 9/2001 | Rinde | |
| 6,576,297 B1 | 6/2003 | Cameron | |
| 6,590,011 B1 | 7/2003 | Rappoport | |
| 2008/0200589 A1* | 8/2008 | Hubschmid | C08L 53/00 523/436 |
| 2014/0186635 A1* | 7/2014 | Mueller | C08G 12/00 428/426 |

FOREIGN PATENT DOCUMENTS

| | | |
|---|---|---|
| CN | 1281491 | 1/2012 |
| EP | 0 488 949 A2 | 6/1992 |
| GB | 1 581 982 | 12/1980 |
| WO | WO 2000/22024 | 4/2000 |
| WO | WO 2008/064115 | 5/2008 |
| WO | WO 2008/089410 | 7/2008 |

OTHER PUBLICATIONS

Huntsman HY 355 Cycloaliphatic Amine, 2012, one page.
Huntsman Technical Bulletin for "Jeffamine® EDR-148 Polyetheramine", 2007, two pages.

* cited by examiner

*Primary Examiner* — Ana L Woodward
(74) *Attorney, Agent, or Firm* — Philip P. Soo

(57) ABSTRACT

Epoxy curatives and two-part compositions comprising epoxy curative and epoxy resin parts are provided as well as methods of their use in liquid shim applications. Epoxy curatives comprise at least one cycloaliphatic polyamine curative and at least one second curative selected from a) an aliphatic polyamidoamine and b) an adduct of an excess of an unbranched polyetherdiamine with an epoxy resin.

4 Claims, No Drawings

TWO-PART LIQUID SHIM COMPOSITIONS

CROSS REFERENCE TO RELATED APPLICATION

This application is a continuation application of U.S. patent application Ser. No. 12/702,446, filed on Feb. 9, 2010, which claims the benefit of U.S. Provisional Patent Application No. 61/151,076, filed Feb. 9, 2009, the disclosure of which is incorporated by reference herein in its entirety.

FIELD OF THE DISCLOSURE

This disclosure relates to curative compositions and two-part compositions comprising curative and epoxy resin parts, which may be useful in liquid shim applications, as well as methods of their use.

BACKGROUND OF THE DISCLOSURE

Shims are used in many facets of assembly operations to position and fill gaps between assembled parts. The need for shimming is particularly acute in aerospace assembly operations due to the tight tolerance requirements and need to eliminate gaps at interfaces. Shims used for assembly operations generally fall within three categories. Solid shims are, in some cases, made of the same material as the interfacing parts. Laminated peelable shims may be made of foil layers that can be removed one-by-one until a good fit is achieved. Liquid shim materials may be useful in filling irregular or tapered interfaces. Liquid shim materials are typically used to fill gaps no bigger than 0.7 mm in width.

SUMMARY OF THE DISCLOSURE

The present disclosure provides epoxy compositions, curative compositions, and two-part compositions comprising the present epoxy and curative compositions, which may be useful as liquid shim applications and methods of their use.

Briefly, the present disclosure provides an epoxy curative comprising at least one cycloaliphatic polyamine curative and at least one second curative selected from a) an aliphatic polyamidoamine and b) an adduct of an excess of an unbranched polyetherdiamine with an epoxy resin. In some embodiments, the at least one second curative is an aliphatic polyamidoamine. In some embodiments, the at least one second curative is an adduct of an excess of an unbranched polyetherdiamine with an epoxy resin. In some such embodiments, the unbranched polyetherdiamine is a compound according to Formula I:

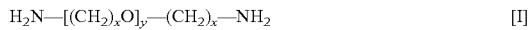

$$H_2N-[(CH_2)_xO]_y-(CH_2)_x-NH_2 \quad [I]$$

where y is 1, 2, 3 or 4, and where each x is independently selected from 2, 3, or 4. In some such embodiments, the adduct of an excess of an unbranched polyetherdiamine with an epoxy resin is an adduct of between 2 and 8 parts unbranched polyetherdiamine per part of epoxy resin. In some embodiments, the epoxy curative additionally comprises at least one calcium nitrate accelerator. In some embodiments, the epoxy curative comprises no particulate metal.

In another aspect, the present disclosure provides a method of filling a gap comprising the steps of: a) mixing an epoxy component comprising an epoxy resin with an epoxy curative according to the present disclosure to make a mixture; b) filling the gap with the mixture; and c) allowing the mixture to cure. In some embodiments, the epoxy component additionally comprises a core-shell impact modifier. In some embodiments, the epoxy component comprises tetraglycidyl meta-xylenediamine, particularly where the epoxy curative is an aliphatic polyamidoamine. In some embodiments, the epoxy component comprises an epoxy novolac resin, particularly where the epoxy curative is an adduct of an excess of an unbranched polyetherdiamine with an epoxy resin.

In another aspect, the present disclosure provides a composition obtained by mixing and allowing to cure: a) an epoxy component comprising an epoxy resin and b) an epoxy curative according to the present disclosure. In some embodiments, the epoxy component additionally comprises a core-shell impact modifier. In some embodiments, the epoxy component comprises tetraglycidyl meta-xylenediamine, particularly where the epoxy curative is an aliphatic polyamidoamine. In some embodiments, the epoxy component comprises an epoxy novolac resin, particularly where the epoxy curative is an adduct of an excess of an unbranched polyetherdiamine with an epoxy resin.

DETAILED DESCRIPTION

The present disclosure provides epoxy compositions, curative compositions, and two-part compositions comprising the present epoxy and curative compositions, which may be useful as liquid shim applications. The present disclosure additionally provides compositions obtained by mixing the two parts of the disclosed two-part compositions.

Any suitable epoxy compositions may be used in the two-part compositions of the present disclosure. Typically a polyfunctional resin having three or more epoxy groups per molecule is used. In some embodiments an epoxy novolac resin may be used. In some embodiments an epoxy resin based on meta-xylenediamine such as ERISYS GA 240, may be used. The epoxy composition may additionally comprise additives which may include impact modifiers, fillers, rheology modifiers and/or pigments.

Any suitable curative composition may be used in the two-part compositions of the present disclosure. The curative composition typically comprises two or more curative species, which are typically polyamines. In some embodiments the curative composition comprises at least one cycloaliphatic polyamine. In some embodiments the curative composition comprises at least one adduct of an excess of an unbranched polyetherdiamine with an epoxy resin, typically an excess of more than 200%, more typically more than 250%, more typically more than 280%, more typically more than 300%, in some embodiments more than 350%, and in some embodiments more than 400%. In some embodiments the curative composition comprises at least one adduct of an excess of an unbranched polyetherdiamine with an epoxy resin, where the excess is typically less than 800%, more typically less than 700%, more typically less than 600%, more typically less than 500% and more typically less than 450%. The unbranched polyetherdiamine typically has a molecular weight of less than 500, more typically less than 400, more typically less than 300, more typically less than 280, more typically less than 260, and more typically less than 240. The unbranched polyetherdiamine typically has a molecular weight of at least 130, more typically at least 150, more typically at least 180 and more typically at least 200. The unbranched polyetherdiamine typically has between one and four ether oxygens and more typically two or three ether oxygens. In some embodiments the unbranched polyetherdiamine may be a compound according to Formula I:

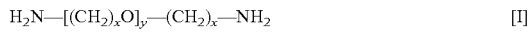

$$H_2N-[(CH_2)_xO]_y-(CH_2)_x-NH_2 \quad [I]$$

where y is 1, 2, 3 or 4, more typically 2 or 3, and where each x is independently selected from 2, 3, or 4, more typically 2 or 3. In some embodiments y is 2. In some embodiments y is 2 and each x is independently selected from 2 or 3. In some embodiments y is 3. In some embodiments y is 3 and each x is independently selected from 2 or 3. In some embodiments the unbranched polyetherdiamine may be 4,7,10-trioxa tridecane 1,13-diamine (TTD). In some embodiments the unbranched polyetherdiamine may be 4,7-dioxa decane 1,10-diamine, commercially available as Jeffamine® EDR 176.

In some embodiments the curative composition comprises both the unbranched polyetherdiamine/epoxy adduct and at least one cycloaliphatic polyamine. The curative composition may additionally comprise calcium nitrates as accelerators, as disclosed in PCT Published App. No. WO2008/089410, the disclosure of which is incorporated herein by reference. The curative composition may additionally comprise additives which may include impact modifiers, fillers, rheology modifiers and/or pigments. However the curative composition according to the present disclosure typically comprises no particulate metal filler or additive. The curative composition according to the present disclosure typically comprises no particulate aluminum or aluminum alloy filler or additive. The curative composition according to the present disclosure typically comprises no particulate iron, steel, or iron alloy filler or additive. The curative composition according to the present disclosure typically comprises no particulate copper or copper alloy filler or additive.

In many embodiments liquid shim compositions will cure fully at room temperature in twenty-four to forty-eight hours and can be sanded or drilled four hours after application. In many embodiments liquid shim compositions will have about 3 hours pot life (time for positioning and adjusting) and may be cured at an accelerated rate with application of mild heat, typically curing in less than 30 minutes at 70° C.

In many embodiments liquid shim compositions will demonstrate characteristics prior to cure including a combination of low viscosity such as may be suitable for injection or application by syringe together with a low degree of sag or creep upon application.

In many embodiments liquid shim compositions will demonstrate characteristics after cure including: good compression strength without brittleness, reasonable strength properties at low and high temperatures (−55 to 120° C.), and resistance to most solvents, oils, hydraulic fluids, and the like. In many embodiments the present compositions will demonstrate Tg after cure of greater than 120° C., more typically greater than 140° C., more typically greater than 160° C., and more typically greater than 180° C. In many embodiments liquid shim compositions must meet the requirements of Airbus AIMS qualification 10-07-001.

Objects and advantages of this invention are further illustrated by the following examples, but the particular materials and amounts thereof recited in these examples, as well as other conditions and details, should not be construed to unduly limit this invention.

Examples

Unless otherwise noted, all reagents were obtained or are available from Aldrich Chemical Co., Milwaukee, Wis., or may be synthesized by known methods.

Epoxy Resin Compositions

The epoxy resin compositions presented in Table I were made by mixing in a small lab mixer. Manufacturing of formulation B4 was done in 21 doppel Z lab mogul. The Novolac resin was introduced into the mogul and blended with the Kane Ace 156. After about 30 minutes mixing Aerosil was added followed by addition of Titanium dioxide powder. The whole was then mixed for at least 40 min under vacuum. The result was a homogeneous white paste.

TABLE I

| Component | Chemical Description | Nominal Role | Formulation (wt % of Components) | | | |
|---|---|---|---|---|---|---|
| | | | B1 | B2 | B3 | B4 |
| ERISYS GA240 | tetra-functional epoxy resin based on meta-Xylenediamine | Base resin | 38 | 0 | 0 | 0 |
| Epon 828 | Epoxy Bisphenol A | Base resin | 0 | 38 | 0 | 0 |
| E-8250 | Epoxy novolac resin | Base resin | 0 | 0 | 38 | 0 |
| D.E.N. 431 | Epoxy novolac resin | Base resin | 0 | 0 | 0 | 30 |
| Kane Ace 156 | p-Butadiene Core shell into DGEBA resin | Impact modifier | 20 | 20 | 20 | 38 |
| Paraloid | Core shell based on butadiene rubber | impact modifier | 5 | 5 | 5 | 0 |
| Kronos | Titanium dioxide | Filler | 32 | 32 | 32 | 30 |
| Aerosil | Treated fumed silica | Rheology Modifier | 5 | 5 | 5 | 2 |
| TOTAL | | | 100 | 100 | 100 | 100 |

Curative Compositions

The curative compositions presented in Table II were made by mixing in a small lab mixer. Manufacture of formulations A1 and A2 was done in the same mogul described for part B4. The first step was introduction of the Ancamine 2167 and calcium nitrate. These were heated to 80° C. and mixed for 1 hour. After cooling down to room temperature (RT) Aerosil was added and mixed until homogeneity. After that the TTD and Epikote 828 adduct was introduced and mixed at RT for about 30 min. After that Minsil and Carbon Black were incorporated and mixed under vacuum for 1 hour. The TTD and Epikote 828 adduct was made by reacting 180 parts of TTD with 60 parts of Epikote 828. The two components were mixed at RT for 1 h and then heated up to 80 C. The temperature was maintained for one hour to complete the pre-polymerization reaction.

TABLE II

| Component | Chemical Description | Nominal Role | Formulation (wt % of Components) | | |
|---|---|---|---|---|---|
| | | | A0 | A1 | A2 |
| Ancamine 2167 | Cyclo aliphatic polyamine | Curative 1 | 40 | 40 | 35 |
| MC 273 | Aliphatic polyamidoamine | Curative 2 | 15 | 15 | 0 |
| TTD & Epikote 828 adduct | 4,7,10-trioxatridecane 1,13-diamine & epoxy resin | Curative 2 | 0 | 0 | 20 |
| Calcium Nitrate | Calcium Nitrate | Accelerator | 0 | 2 | 2 |
| Aerosil | Treated Fumed Silica | Rheology | 5 | 5 | 5 |
| Minsil SF 20 | Silica particles (Amorphous) | Filler | 40 | 37.9 | 37.9 |
| Carbon Black | | Pigment | 0 | 0.1 | 0.1 |
| Total | | | 100 | 100 | 100 |

Resin/Curative Combinations

The present disclosure contemplates any combination of B and A parts, including B1/A0, B1/A1, B1/A2, B2/A0, B2/A1, B2/A2, B3/A0, B3/A1, B3/A2, B4/A0, B4/A1 and B4/A2. The following combinations of B and A parts were made at a ratio of two parts by volume B to one part by volume A: B1/A0, B2/A0, B3/A0, B4/A1 and B4/A2. The mixed viscosity of formulations B4/A1 and B4/A2 were measured to be below 600 Pascals (Pa), measured on Haake RheoWin instrument.

Results—Cure Time

The pot life of the B1/A0, B2/A0 and B3/A0 formulations were determined by DSC measurement (Degree of cure). Table III reports curing potential as function of time after mixing for these three combinations.

TABLE III

| | B1/A0 | B2/A0 | B3/A0 |
|---|---|---|---|
| Curing potential (total) | 100% | 100% | 100% |
| 3 h after mixing | 90% | 70% | 73% |
| 3 h after mixing + 30 min @70° C. | 35% | 28% | 33% |

The pot life of B4/A1 was observed to be approximately 120 min. The pot life of B4/A2 was observed to be approximately 90 min.

Results—Mechanical Testing

Mechanical testing was performed according to Airbus AIMS qualification 10-07-001. Results are disclosed in Tables IV, V and VI.

TABLE IV

| Overlap Shear (MPa) on Aluminum substrates | | | | | | |
|---|---|---|---|---|---|---|
| | Minimum | B1/A0 | B2/A0 | B3/A0 | B4/A1 | B4/A2 |
| RT | 21 | 23 | 24 | 21 | 18 | 24 |
| −55° C. | 18 | 18.5 | 21 | 19 | 12 | 27 |
| 80° C. | 19 | 22 | 18 | 16.5 | 11 | 21 |
| 120° C. | 8.5 | 14 | 5 | 7.7 | 8 | 16 |

TABLE V

| Peel Load | | | | | | |
|---|---|---|---|---|---|---|
| | Minimum | B1/A0 | B2/A0 | B3/A0 | B4/A1 | B4/A2 |
| 23° C. | 50 | 80 | 100 | 95 | 60 | 100 |
| −55° C. | 20 | 45 | 119 | 54 | 15 | 120 |
| 120° C. | 10 | 33 | 15 | 8 | 23 | 35 |

TABLE VI

| Compression Strength | | | | | | |
|---|---|---|---|---|---|---|
| | Minimum | B1/A0 | B2/A0 | B3/A0 | B4/A1 | B4/A2 |
| RT | 55 | 100 | 65 | 70 | 100 | 95 |
| −55° C. | 150 | 170 | 94 | 132 | 175 | 160 |
| 80° C. | 37 | 75 | 32 | 40.5 | 24 | 52 |
| 120° C. | 28 | 35 | 12 | 17 | 17 | 34 |

The B1/A0 and B4/A2 formulations showed the best mechanical characteristics. Additional characterization was performed for the B4/A2 formulation, including fluid resistance and aging tests, reported in Tables VII, VIII and IX.

TABLE VII

| B4/A2 Overlap shear strength (MPa) | | | | |
|---|---|---|---|---|
| Condition | Duration | Test Temp ° C. | Min. | Results |
| Methyl ethyl ketone (MEK) | 1 h | 120 | 8 | 10 |
| Dry heat 120° C. | 7 days | 120 | 8.5 | 18 |
| Water at 70° C. | 7 days | 120 | 7 | 10 |
| Skydrol/H2O mixture | 1000 h | 120 | 7.5 | 9 |
| Skydrol 1000 h | 1000 h | 120 | 8 | 13 |

TABLE VIII

| B4/A2 Peel Load (N) | | | | |
|---|---|---|---|---|
| Condition | Duration | Test Temp ° C. | Min. | Results |
| Dry heat 120° C. | 7 days | 23 | 50 | 107 |

TABLE IX

| B4/A2 Compression strength (MPa | | | | |
|---|---|---|---|---|
| Condition | Duration | Test Temp ° C. | Min. | Results |
| 85% R.H. & 70° C. | 1000 h | 23 | 55 | 93 |
| 85% R.H. & 70° C. | 1000 h | −55 | 150 | 160 |
| 85% R.H. & 70° C. | 1000 h | 120 | 18 | 24 |

Various modifications and alterations of this invention will become apparent to those skilled in the art without departing from the scope and principles of this invention, and it should be understood that this invention is not to be unduly limited to the illustrative embodiments set forth hereinabove.

I claim:

1. A method of filling a gap comprising the steps of:
   a) mixing an epoxy component comprising a core-shell impact modifier based on butadiene rubber and an epoxy novolac resin with an epoxy curative to make a mixture, wherein the epoxy curative comprises
      at least one cycloaliphatic polyamine curative and
      at least one second curative comprising an adduct of between 2 and 8 molar parts of 4,7,10-trioxatridecane 1,13-diamine or 4,7-dioxadecane 1,10-diamine per molar part of an epoxy novolac resin;
   b) filling the gap with the mixture; and
   c) allowing the mixture to cure.

2. The method of claim 1, wherein the epoxy curative additionally comprises at least one calcium nitrate accelerator.

3. The method of claim 1, wherein the epoxy curative comprises no particulate metal.

4. The composition obtained by mixing and allowing to cure:
   a) an epoxy component comprising a core-shell impact modifier based on butadiene rubber and an epoxy novolac resin and
   b) an epoxy curative comprising at least one cycloaliphatic polyamine curative and at least one second curative comprising an adduct of between 2 and 8 molar parts of 4,7,10-trioxatridecane 1,13-diamine or 4,7-dioxadecane 1,10-diamine per molar part of an epoxy novolac resin.

* * * * *